US007934647B1

(12) United States Patent
Mims et al.

(10) Patent No.: US 7,934,647 B1
(45) Date of Patent: May 3, 2011

(54) IN-CART GROCERY TABULATION SYSTEM AND ASSOCIATED METHOD

(76) Inventors: Darla Mims, Atlanta, GA (US); Clarence Mims, Atlanta, GA (US)

(*) Notice: Subject to any disclaimer, the term of this patent is extended or adjusted under 35 U.S.C. 154(b) by 0 days.

(21) Appl. No.: 12/657,512

(22) Filed: Jan. 22, 2010

(51) Int. Cl.
*G06K 15/00* (2006.01)
(52) U.S. Cl. ........................................ 235/383; 235/431
(58) Field of Classification Search .................. 235/383, 235/431
See application file for complete search history.

(56) References Cited

U.S. PATENT DOCUMENTS

| | | | |
|---|---|---|---|
| 4,071,740 A * | 1/1978 | Gogulski | 235/431 |
| 5,250,789 A | 10/1993 | Johnsen | |
| 5,418,354 A | 5/1995 | Halling et al. | |
| 5,424,524 A | 6/1995 | Ruppert et al. | |
| 5,630,071 A * | 5/1997 | Sakai et al. | 705/21 |
| 5,773,954 A * | 6/1998 | VanHorn | 320/137 |
| 6,032,127 A | 2/2000 | Schkolnick et al. | |
| 6,910,697 B2 | 6/2005 | Varatharajah et al. | |
| 6,997,382 B1 | 2/2006 | Bhri | |
| 7,168,618 B2 * | 1/2007 | Schwartz | 235/383 |
| 7,246,745 B2 * | 7/2007 | Hudnut et al. | 235/383 |
| 2002/0170961 A1 * | 11/2002 | Dickson et al. | 235/383 |
| 2005/0187819 A1 * | 8/2005 | Johnson | 705/14 |
| 2005/0218217 A1 * | 10/2005 | Hasegawa et al. | 235/383 |
| 2006/0074763 A1 * | 4/2006 | Schmid | 705/26 |
| 2006/0283943 A1 * | 12/2006 | Ostrowski et al. | 235/383 |
| 2007/0084918 A1 * | 4/2007 | Tabet et al. | 235/383 |
| 2007/0125848 A1 * | 6/2007 | Bannetto Piamenta | 235/383 |
| 2009/0268941 A1 * | 10/2009 | French et al. | 382/103 |
| 2010/0096450 A1 * | 4/2010 | Silverbrook et al. | 235/380 |

* cited by examiner

*Primary Examiner* — Allyson N Trail

(57) ABSTRACT

An in-cart grocery tabulation system includes a shopping cart adapted to receive grocery items. A first and second scanner may be statically attached to a top region and a bottom region of the shopping cart respectively. Each of the first and second scanners may generate and transmit a price signal to a tabulation mechanism communicatively coupled to the first and second scanners. The tabulation mechanism may further be adapted to keep track of a price list associated with the scanned grocery items in the shopping cart. A display screen may be coupled to the tabulation mechanism and further affixed to the shopping cart to verify the price signal and thereafter transmits a display signal to the display screen. A user interface may be communicatively coupled to the display screen for reviewing the price list.

12 Claims, 4 Drawing Sheets

IN-CART GROCERY TABULATION SYSTEM AND ASSOCIATED METHOD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to shopping carts and more particularly, to an in-cart grocery tabulation system and associated method for providing users with an easy and convenient means of automatically identifying and calculating the total cost of groceries present in a shopping cart.

2. Prior Art

In the past grocery stores did not have shopping carts. A customer would ask the clerk for the items he intended to purchase and the clerk would go around the store, gather and package the items and total the price of the purchase for the customer. When shopping cart was first introduced to stores, common wisdom was that the customers would never find the items they wanted without help. As customers grew accustomed to the layout of the stores, the stores were able to service more customers with fewer employees. The grocery cart allowed store employees to concentrate on stocking the shelves and checking out customers. The store's employees no longer had to gather the items for the customer; this resulted in improved productivity for grocery stores, which in turn resulted in lower prices for the consumer.

As this store format became accepted, one of the major labor costs for stores became checking out customers. Checkers were required to hand enter the price and to bag every item. This was a slow, inaccurate process and the major bottleneck in the grocery sales process. This problem was alleviated by the introduction of a bar code on products and a bar code scanner at the check out lines. This allowed checkers to greatly increase their productivity and accuracy. It also greatly improved inventory management and purchasing accuracy. However, customer lines at the check-out were not significantly reduced, since most stores used this productivity advantage to reduce the number of checkers. Added to this, customers may return items at the checkout counters due to budget over-runs and thus increase the labor cost of stores having to return the rejected items back to their original location on the shelves Accordingly, a need remains for a system in order to overcome the above-noted shortcomings. The present invention satisfies such a need by providing an in-cart grocery tabulation system that is convenient and easy to use, is durable yet lightweight in design, is versatile in its applications, and automatically identifies and calculates the total cost of groceries present in a shopping cart.

BRIEF SUMMARY OF THE INVENTION

In view of the foregoing background, it is therefore an object of the present invention to provide an apparatus for automatically identifying and calculating the total cost of groceries present in a shopping cart. These and other objects, features, and advantages of the invention are provided by an in-cart grocery tabulation system.

The in-cart grocery tabulation system may include a mobile shopping cart adapted to receive grocery items. A first scanner may be statically attached to a top region of the shopping cart and a second scanner may be statically attached to a bottom region of the shopping cart respectively. Each of the first and second scanners may generate and transmit a price signal to a tabulation mechanism communicatively coupled to the first and second scanners. The tabulation mechanism may further be adapted to keep track of a price list associated with the scanned grocery items in the shopping cart.

A display screen may be communicatively coupled to the tabulation mechanism and further affixed to the shopping cart such that the tabulation mechanism may verify the price signal and thereafter transmits a display signal to the display screen. In this way, a user may learn of a total cost of the grocery items placed within the shopping cart. A user interface may further be communicatively coupled to the display screen for reviewing the price list. Such an arrangement provides the unexpected and unpredictable advantage of a system adapted to a shopping cart to allow users to automatically identifying and calculating the total cost of groceries present in a shopping cart and thus manage their shopping expenses within their means.

The shopping cart may include a frame preferably having isolated upper and lower sections adapted to receive the grocery items therein. A handlebar may be attached to the frame and the upper section respectively. The user interface and the display screen may further be coupled to the handlebar. A plurality of wheels may be connected to the lower section. Such an arrangement provides the unexpected and unpredictable advantage of allowing users to ergonomically view their grocery items displayed on the display screen while simultaneously wheeling their shopping carts anywhere in a store.

In one embodiment, the first scanner may include an elongated curvilinear shape located along a top edge of the upper section such that the first scanner extends along an entire perimeter of the top edge. The second scanner may likewise include an elongated curvilinear shape disposed above a top surface of the lower section. Such an arrangement provides the unexpected and unpredictable advantage of allowing the grocery items to be individually scanned while they are being placed in the upper section or lower sections of the shopping cart respectively.

The tabulation mechanism may be situated at the lower section of the frame and may include a processor communicatively coupled to the first and second scanners. A memory may be communicatively coupled to the processor and a database communicatively coupled to the memory. The database may further contain a list of barcodes and a list of prices associated therewith. A plurality of sensors may be located along a bottom surface of the upper and lower sections to generate and transmit a detection signal to the processor upon detecting a weight change at the upper and lower sections respectively.

A power source may further be communicatively coupled to the processor. The memory may include a computer readable software program that causes the tabulation mechanism to verify the price signal as the grocery item is positioned within one of the upper and lower sections. The first and second scanners may remain spaced apart along the upper and lower sections of the frame respectively. Such an arrangement provides the unexpected and unpredictable advantage of scanning the grocery items regardless of whether they are placed in the upper and lower sections respectively The computer readable software program may include a control logic algorithm for executing the steps of receiving the price signal from at least one of the first and second scanners. For example, the software program may extrapolate a barcode data stream from the price signal; locate the barcode data stream in the barcode list; and match a price from the price list that is associated with the located barcode data stream. The software program may further receive the detection signal from the sensors; generate and transmit a first output signal to at least one of the first and second scanners if the processor receives the detection signal prior to receiving the price signal; and further generate and transmit a second output signal to at least one of the first and second scanners if the processor receives the detection signal after receiving the price signal. Such an arrangement provides the unexpected and unpredictable advantage of automatically generating and updating the list and total cost of items placed within the shopping cart.

In one embodiment, the first and second scanners may further illuminate to a first and second colors upon receiving the first and second output signals so that a user may identify an unverified grocery item. Such an arrangement provides the unexpected and unpredictable advantage of alerting users that an item has been scanned and captured by the system when it is placed within the shopping cart.

The invention may include a method for utilizing an in-cart grocery tabulation system for automatically identifying and calculating the total cost of groceries present in a shopping cart. Such a method preferably includes the chronological steps of: providing a mobile shopping cart adapted to receive grocery items therein; providing and statically attaching a first scanner to a top region of the shopping cart; providing and statically attaching a second scanner to a bottom region of the shopping cart; and providing and adapting a tabulation mechanism to keep track of a price list associated with the scanned grocery items in the shopping cart by communicatively coupling the tabulation mechanism to the first and second scanners respectively.

The method may further include the steps of: providing and affixing a display screen to the shopping cart; providing and communicatively coupling the display screen to the tabulation mechanism; providing and communicatively coupling a user interface to the display screen for reviewing the price list; providing each of the first and second scanners to generate and transmit a price signal to the tabulation mechanism; and providing the tabulation mechanism to verify the price signal and thereafter transmitting a display signal to the display screen such that a user learns of a total cost of the grocery items placed within the shopping cart.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
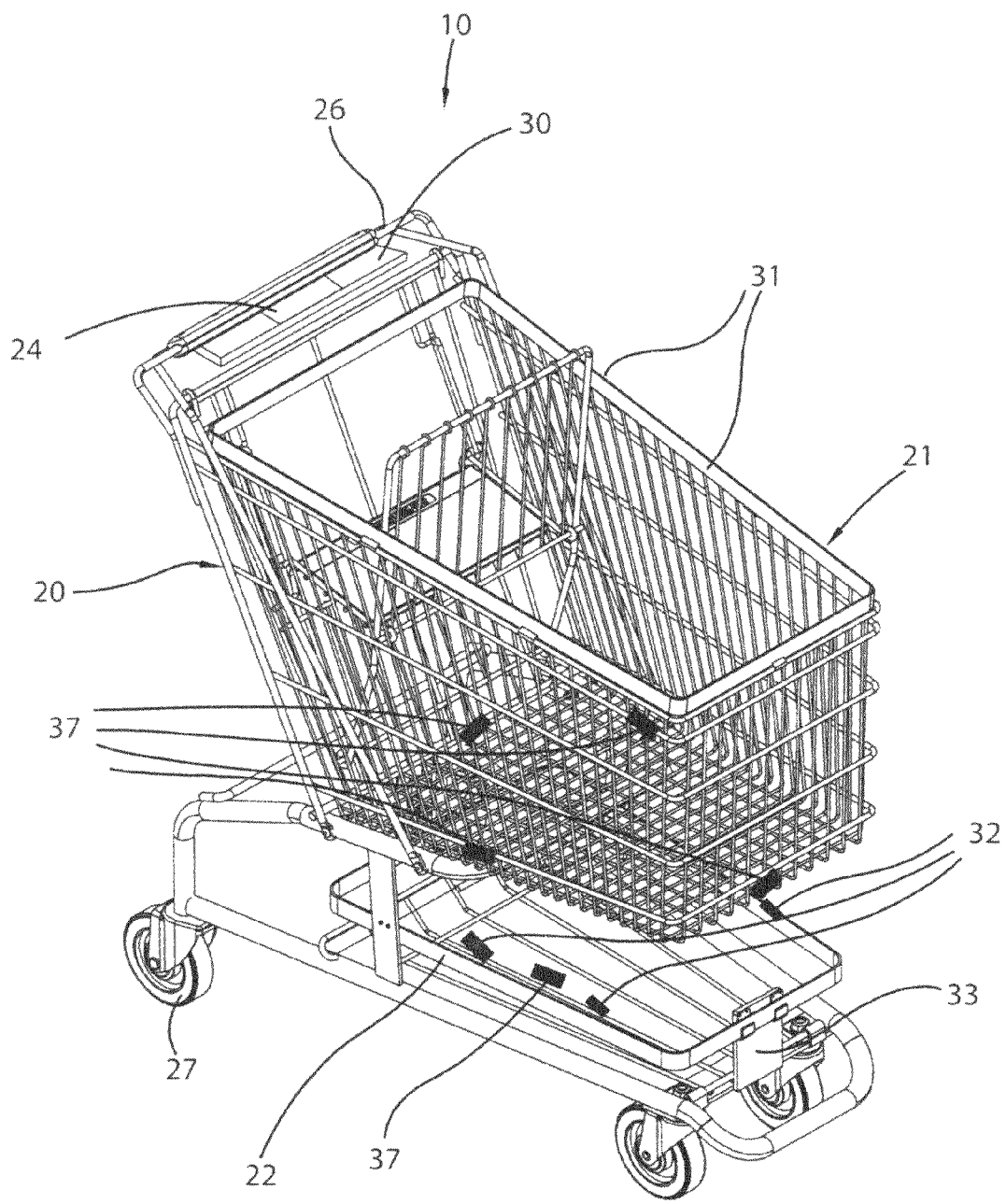
FIG. 1 is a perspective view showing an in-cart grocery tabulation system, in accordance with the present invention.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-4 by the reference numeral 10 and is intended to provide an in-cart grocery tabulation system. It should be understood that the in-cart grocery tabulation system 10 may be used to automatically identify and calculate the total cost of groceries present in a shopping cart many different types of inventory systems.

Referring generally to FIGS. 1-4, the in-cart grocery tabulation system 10 may include a mobile shopping cart 20 adapted to receive grocery items 11 therein. A first scanner 31 may be statically attached to a top region 21 of the shopping cart 20 and a second scanner 32 may be statically attached to a bottom region 22 of the shopping cart 20, respectively. Each of the first and second scanners 31, 32 may generate and transmit a price signal to a tabulation mechanism 33 communicatively coupled to the first and second scanners 31, 32. The first and second scanners 31, 32 may remain spaced apart along the upper and lower sections 24, 25 of the frame 23 respectively. The tabulation mechanism 33 is advantageously adapted to keep track of a price list associated with the scanned grocery items 11 in the shopping cart 20.

A display screen 24 may be communicatively coupled to the tabulation mechanism 33 and further affixed to the shopping cart 20 such that the tabulation mechanism 33 verifies the price signal and thereafter transmits a display signal to the display screen 24. In this way, a user learns of a total cost of the grocery items 11 placed within the shopping cart 20. Further, a user interface 30 may be communicatively coupled to the display screen 24 for reviewing the price list. Such an arrangement provides the unexpected and unpredictable advantage of an in-cart grocery tabulation system 10 to allow users to automatically identify and calculate the total cost of groceries present in a shopping cart 20 and thus manage their shopping expenses prior to reaching the check out counter.

Figure 2:
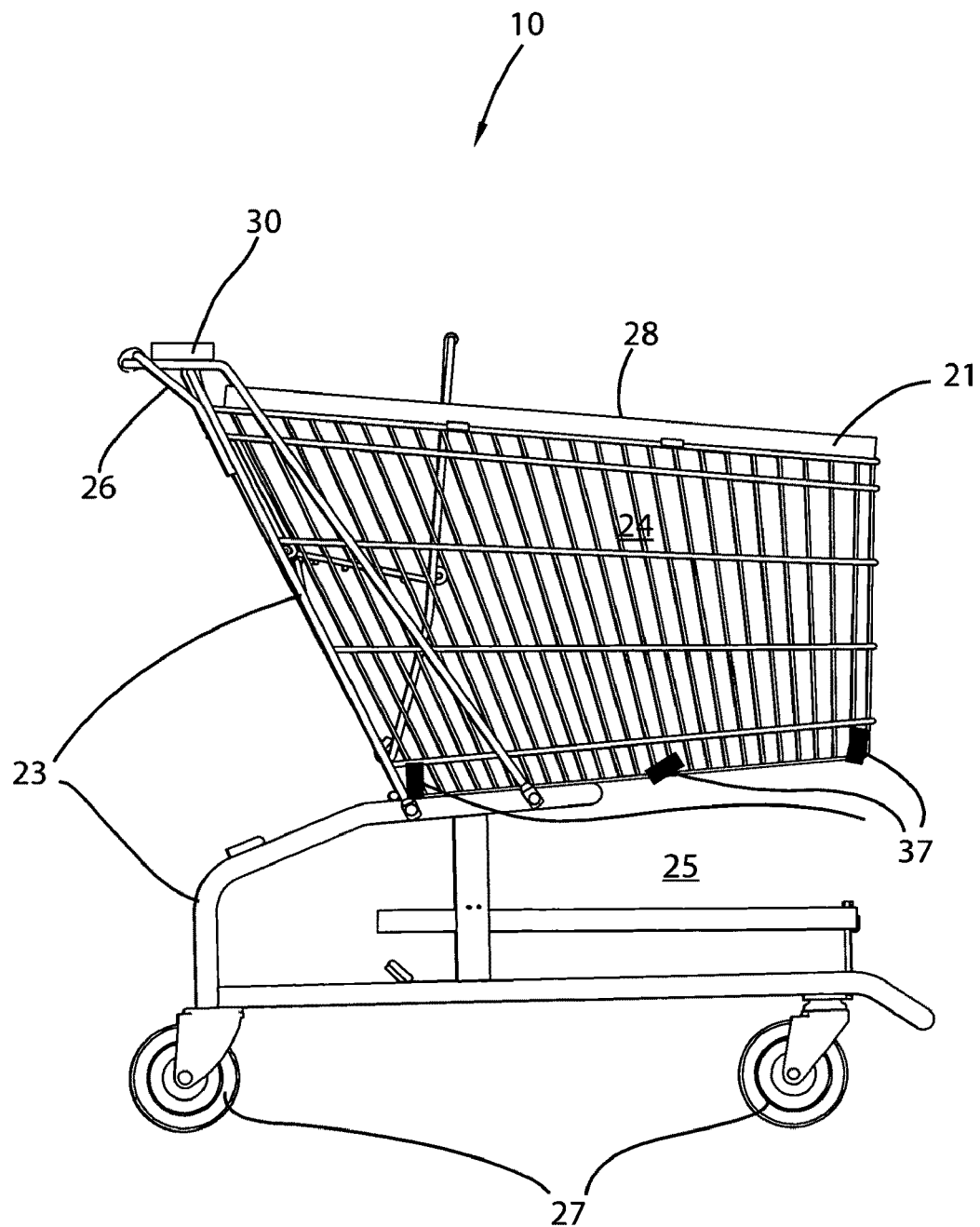
FIG. 2 is a side elevational view of the system shown in FIG. 1.

Referring to FIGS. 1-2, the shopping cart 20 may include a frame 23 preferably having isolated upper and lower sections 24, 25 adapted to receive the grocery items 11 therein. A handlebar 26 may be attached to the frame 23 and the upper section 24, respectively. The user interface 30 and the display screen 24 may be coupled to the handlebar 26. A plurality of wheels 27 may be connected to the lower section 25. Such an arrangement provides the unexpected and unpredicted advantage of allowing users to ergonomically view their grocery items 11 displayed on the display screen 24 while simultaneously wheeling their shopping carts 20 in a store.

Figure 3:
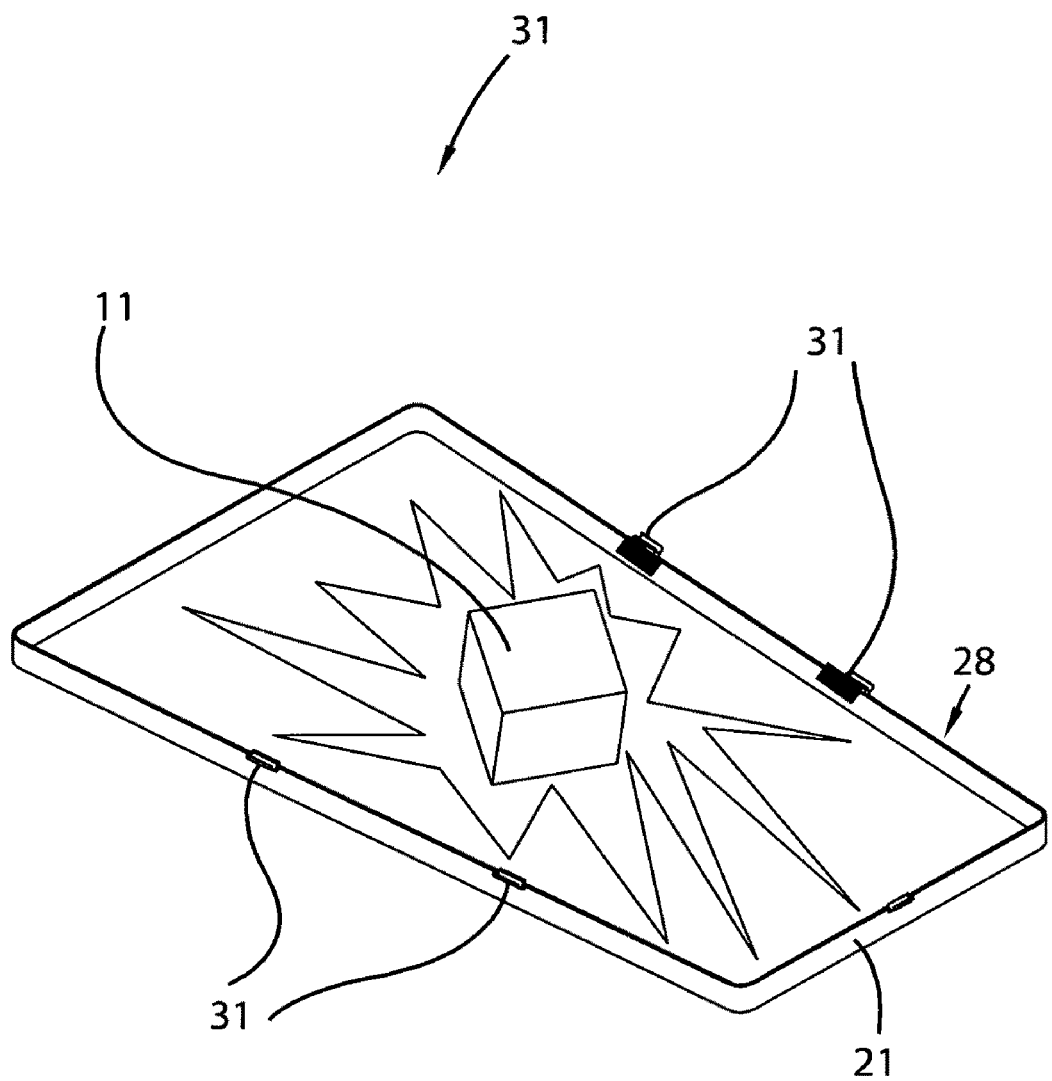
FIG. 3 is a perspective view showing an exemplary embodiment of the first scanner.

Referring to FIGS. 2-3, the first scanner 31 may include an elongated curvilinear shape located along a top edge 28 of the upper section 24 such that the first scanner 31 extends along an entire perimeter of the top edge 28. The second scanner 32 may likewise include an elongated curvilinear shape disposed above a top surface 29 of the lower section 25. Such an arrangement provides the unexpected and unpredicted advantage of allowing the grocery items 11 to be individually scanned while they are being placed in the upper section 24 or lower section 25 of the shopping cart 20, respectively. Thus, the user is able to quickly verify a running total of the grocery item price list, prior to checking out at the cash register.

Figure 4:
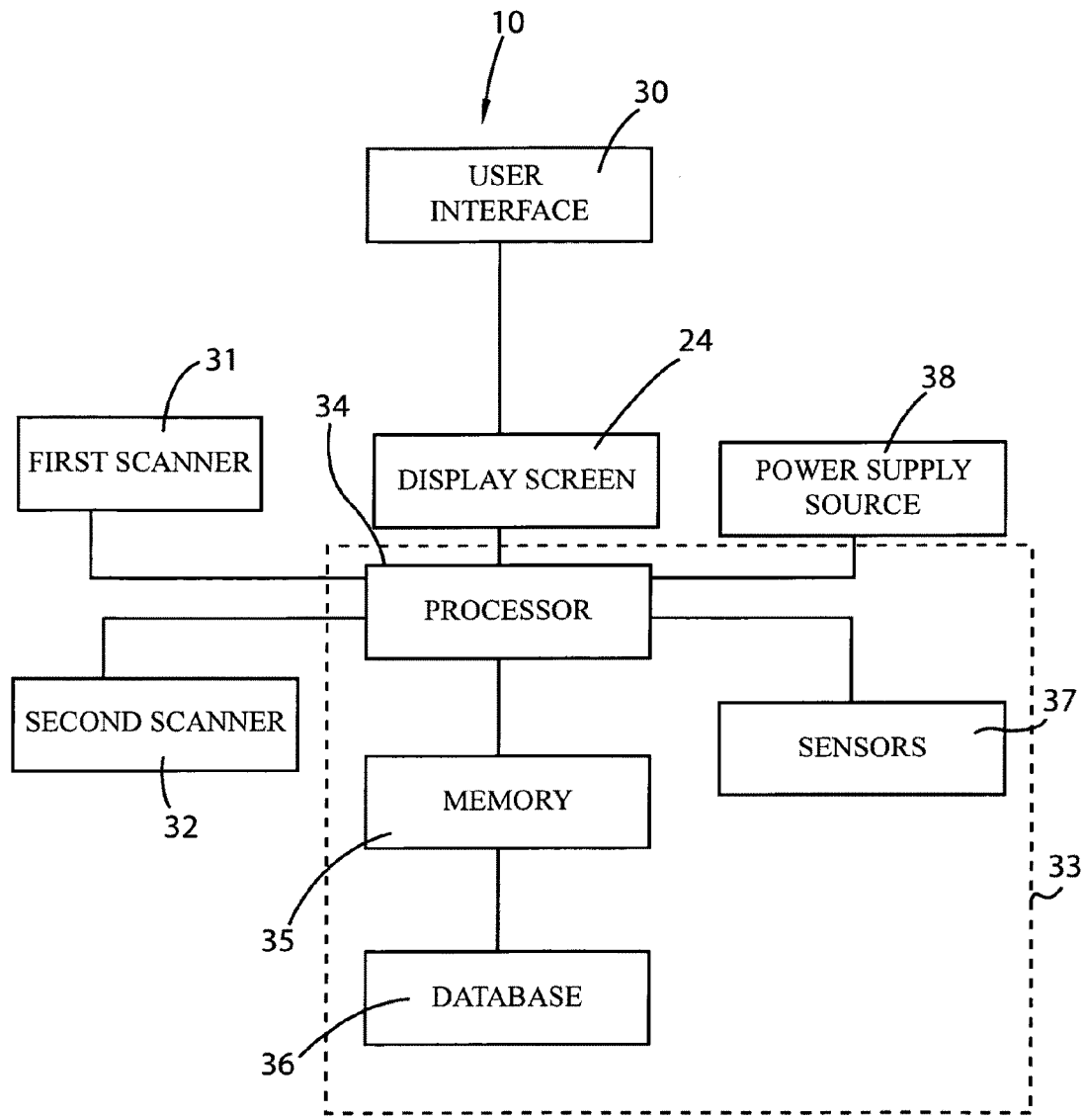
FIG. 4 is a high-level schematic block diagram showing the interrelationship between the major electronic components of the present invention.

Referring to FIGS. 1, 2 and 4, the tabulation mechanism 33 may be situated at the lower section 25 of the frame 23 and may include a processor 34 communicatively coupled to the first and second scanners 31, 32. A memory 35 may be communicatively coupled to the processor 34, and a database 36 may be communicatively coupled to the memory 35. The database 36 may further contain a list of barcodes and a list of prices associated therewith. A plurality of sensors 37 may be located along a bottom surface of the upper and lower sections 24, 25, respectively, to generate and transmit a detection signal to the processor 34 upon detecting a weight change at the upper and lower sections 24, 25, respectively. A power source 38 may be communicatively coupled to the processor 34.

Advantageously, the memory 35 preferably includes a computer readable software program that causes the tabulation mechanism 33 to verify the price signal as the grocery item 11 is positioned within one of the upper and lower sections 24, 25. Such a software program provides the unexpected and unpredicted advantage of scanning the grocery items 11 prior to being placed in the upper and lower sections 24, 25, respectively. Thus, if the grocery item 11 is not recognized or otherwise has an invalid price tag, the tabulation mechanism 33 will notify the user of the scanning error.

In particular, the computer readable software program preferably includes a control logic algorithm that includes and executes the steps of: receiving the price signal from at least one of the first and second scanners 31, 32; extrapolating a barcode data stream from the price signal; locating the barcode data stream in the barcode list; and matching a price from the price list that is associated with the located barcode data stream. In addition, the chronological steps further include: receiving the detection signal from the sensors 37; generating and transmitting a first output signal to at least one of the first and second scanners 31, 32 if the processor 34 receives the detection signal prior to receiving the price signal; and generating and transmitting a second output signal to at least one of the first and second scanners 31, 32 if the processor 34 receives the detection signal after receiving the price signal. Such an arrangement provides the unexpected and unpredicted advantage of automatically generating and updating the list and total cost of grocery items 11 placed within the shopping cart 20.

In this manner, the first and second scanners 31, 32 illuminate to a first (green) and second (red) colors upon receiving the first and second output signals so that a user quickly identifies an unverified grocery item. Such an arrangement provides the unexpected and unpredictable advantage of alerting users whether an item has been scanned and captured by the tabulation mechanism 33 when it is placed within the shopping cart 20. Advantageously, if a grocery item 11 price tag is not recognized or verified, the tabulation mechanism 33 notifies the user that the price of the most recent grocery item 11 has not been added to the price list on the display screen 24. For example, if the first and second scanners 31, 32 illuminate to a red color, the user knows the grocery item 11 price tag was not verified. Alternately, if the first and second scanners 31, 32 illuminate to a green color, the user knows the grocery item 11 price tag was verified.

The invention may include a method for utilizing an in-cart grocery tabulation system 10 for automatically identifying and calculating the total cost of groceries present in a shopping cart 20. Such a method preferably includes the chronological steps of: providing a mobile shopping cart 20 adapted to receive grocery items 11 therein; providing and statically attaching a first scanner 31 to a top region 21 of the shopping cart 20; providing and statically attaching a second scanner 32 to a bottom region 22 of the shopping cart 20; and providing and adapting a tabulation mechanism 33 to keep track of a price list associated with the scanned grocery items 11 in the shopping cart 20 by communicatively coupling the tabulation mechanism 33 to the first and second scanners 31, 32 respectively.

The method may further include the chronological steps of: providing and affixing a display screen 24 to the shopping cart 20; providing and communicatively coupling the display screen 24 to the tabulation mechanism 33; providing and communicatively coupling a user interface 30 to the display screen 24 for reviewing the price list; providing each of the first and second scanners 31, 32 to generate and transmit a price signal to the tabulation mechanism 33; and the tabulation mechanism 33 verifying the price signal and thereafter transmitting a display signal to the display screen 24 such that a user learns of a total cost of the grocery items 11 placed within the shopping cart 20.

The combination of such claimed elements provides an unpredictable and unexpected benefit of conveniently tabulating and calculating the cost of grocery items to monitor users' spending to stay within their budget, which also solves the problem of shopaholics spending beyond their means. Another benefit to stores is that the system 10 may guide shoppers as to when they should stop browsing and handling grocery which they may not be able to afford to purchase. In this way, the stores may further optimize their store space for genuine shoppers and reduce the instances of returned goods at the check-out counters.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An in-cart grocery tabulation system for automatically identifying and calculating the total cost of groceries present in a shopping cart, said in-cart grocery tabulation system comprising:
   a shopping cart adapted to receive grocery items therein;
   a first scanner attached to a top region of said shopping cart;
   a second scanner attached to a bottom region of said shopping cart, each of said first and second scanners generating and transmitting a price signal to said tabulation mechanism;
   a tabulation mechanism communicatively coupled to said first and second scanners, said tabulation mechanism adapted to keep track of a price list associated with the scanned grocery items in said shopping cart;
   a display screen communicatively coupled to said tabulation mechanism, wherein said tabulation mechanism verifies said price signal and thereafter transmits a display signal to said display screen such that a user learns of a total cost of the grocery items placed within said shopping cart; and
   a user interface communicatively coupled to said display screen for reviewing the price list;
   wherein said shopping cart comprises
   a frame having isolated upper and lower sections adapted to receive the grocery items therein;
   a handlebar attached to said frame and said upper section respectively, said user interface and said display screen being coupled to said handlebar; and
   a plurality of wheels connected to said lower section;
   wherein said tabulation mechanism is situated at said lower section of said frame and comprises
   a processor communicatively coupled to said first and second scanners;
   a memory communicatively coupled to said processor;
   a database communicatively coupled to said memory, said database containing a list of barcodes and a list of prices associated therewith;
   a plurality of sensors located along a bottom surface of said upper and lower sections respectively, said sensors generating and transmitting a detection signal to said processor upon detecting a weight change at said upper and lower sections respectively; and
   a power source communicatively coupled to said processor;
   wherein said memory includes a computer readable software program that causes said tabulation mechanism to verify said price signal as the grocery item is positioned within one of said upper and lower sections respectively.

2. The in-cart grocery tabulation system of claim 1, wherein said first scanner has an elongated curvilinear shape located along a top edge of said upper section such that said first scanner extends along an entire perimeter of said top edge.

3. The in-cart grocery tabulation system of claim 2, wherein said second scanner has an elongated curvilinear shape disposed above a top surface of said lower section.

4. The in-cart grocery tabulation system of claim 1, wherein said first and second scanners remain spaced apart along said upper and lower sections of said frame respectively.

5. The in-cart grocery tabulation system of claim 1, wherein said computer readable software program comprises: a control logic algorithm including and executing the steps of
   receiving said price signal from at least one of said first and second scanners;
   extrapolating a barcode data stream from said price signal;
   locating said barcode data stream in said barcode list;
   matching a price from said price list that is associated with said located barcode data stream;
   receiving said detection signal from said sensors;
   generating and transmitting a first output signal to said at least one of said first and second scanners if said processor receives said detection signal prior to receiving said price signal; and
   generating and transmitting a second output signal to said at least one of said first and second scanners if said processor receives said detection signal after receiving said price signal.

6. The in-cart grocery tabulation system of claim 5, wherein said at least one first and second scanners illuminates to first and second colors upon receiving said first and second output signals so that a user identifies an unverified grocery item.

7. An in-cart grocery tabulation system for automatically identifying and calculating the total cost of groceries present in a shopping cart, said in-cart grocery tabulation system comprising:
   a mobile shopping cart adapted to receive grocery items therein;
   a first scanner statically attached to a top region of said shopping cart;
   a second scanner statically attached to a bottom region of said shopping cart, each of said first and second scanners generating and transmitting a price signal to said tabulation mechanism;
   a tabulation mechanism communicatively coupled to said first and second scanners, said tabulation mechanism adapted to keep track of a price list associated with the scanned grocery items in said shopping cart;
   a display screen communicatively coupled to said tabulation mechanism and affixed to said shopping cart, wherein said tabulation mechanism verifies said price signal and thereafter transmits a display signal to said display screen such that a user learns of a total cost of the grocery items placed within said shopping cart; and
   a user interface communicatively coupled to said display screen for reviewing the price list;
   wherein said shopping cart comprises:
   a frame having isolated upper and lower sections adapted to receive the grocery items therein;
   a handlebar attached to said frame and said upper section respectively, said user interface and said display screen being coupled to said handlebar; and
   a plurality of wheels connected to said lower section;
   wherein said tabulation mechanism is situated at said lower section of said frame and comprises
   a processor communicatively coupled to said first and second scanners;
   a memory communicatively coupled to said processor;
   a database communicatively coupled to said memory, said database containing a list of barcodes and a list of prices associated therewith;

a plurality of sensors located along a bottom surface of said upper and lower sections respectively, said sensors generating and transmitting a detection signal to said processor upon detecting a weight change at said upper and lower sections respectively; and a power source communicatively coupled to said processor;

wherein said memory includes a computer readable software program that causes said tabulation mechanism to verify said price signal as the grocery item is positioned within one of said upper and lower sections respectively.

8. The in-cart grocery tabulation system of claim 7, wherein said first scanner has an elongated curvilinear shape located along a top edge of said upper section such that said first scanner extends along an entire perimeter of said top edge.

9. The in-cart grocery tabulation system of claim 8, wherein said second scanner has an elongated curvilinear shape disposed above a top surface of said lower section.

10. The in-cart grocery tabulation system of claim 7, wherein said first and second scanners remain spaced apart along said upper and lower sections of said frame respectively.

11. The in-cart grocery tabulation system of claim 10, wherein said at least one first and second scanners illuminates to first and second colors upon receiving said first and second output signals so that a user identifies an unverified grocery item.

12. The in-cart grocery tabulation system of claim 7, wherein said computer readable software program comprises: a control logic algorithm including and executing the steps of receiving said price signal from at least one of said first and second scanners;

extrapolating a barcode data stream from said price signal;

locating said barcode data stream in said barcode list;

matching a price from said price list that is associated with said located barcode data stream;

receiving said detection signal from said sensors;

generating and transmitting a first output signal to said at least one of said first and second scanners if said processor receives said detection signal prior to receiving said price signal; and generating and transmitting a second output signal to said at least one of said first and second scanners if said processor receives said detection signal after receiving said price signal.

* * * * *